Feb. 1, 1966 J. C. MILES 3,232,584
FOLDING JACK
Filed May 19, 1964

James C. Miles
INVENTOR.

BY *Oliver D. Olson*

Agent

United States Patent Office 3,232,584
Patented Feb. 1, 1966

3,232,584
FOLDING JACK
James C. Miles, 1940 Warner St. NE., Salem, Oreg.
Filed May 19, 1964, Ser. No. 368,570
5 Claims. (Cl. 254—98)

This invention relates to jacks, and more particularly to a house trailer jack which is capable of being folded to compact dimensions for convenient storage when not in use.

The support of a house trailer in a stable, horizontal position generally is achieved by the use of a plurality of vertically adjustable jacks positioned at appropriate locations about the perimeter of the trailer. However, whenever the trailer is to be moved to a new location, it is necessary to remove the jacks and store them within the trailer or towing vehicle. House trailer jacks provided heretofore have been incapable of folding to a sufficient degree to permit such storage in a reasonably small space.

Accordingly, it is the principal object of the present invention to provide a jack capable of being folded to such small dimensions as to enable the storage of a multiplicity of them in a small space.

Another important object of this invention is the provision of a folding jack of the class described which, when unfolded to operative position, provides a rigid and completely stable support.

A further important object of the present invention is the provision of a folding jack of the class described which includes simplified means for adjusting its operative length.

A still further important object of the present invention is the provision of a folding jack of the class described which is of simplified construction for economical manufacture.

The foregoing and other objects and advantages of this invention will appear from the following detailed description, taken in connection with the accompanying drawing in which.

Figure 1:
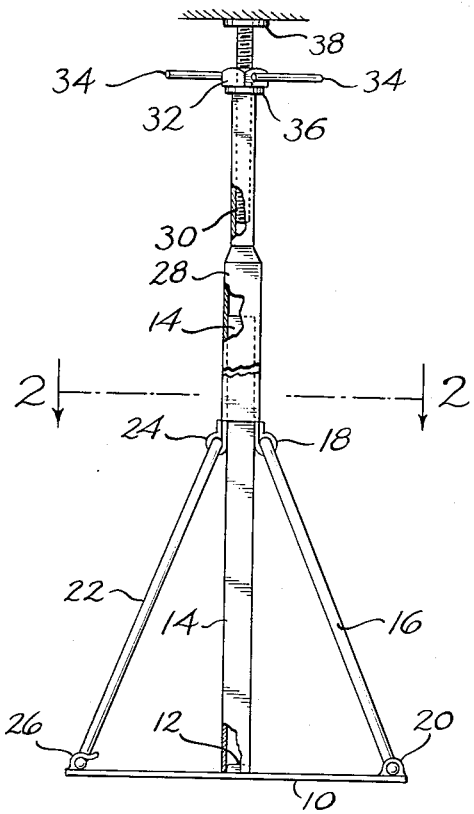
FIG. 1 is a foreshortened side elevation of a folding jack embodying the features of the present invention, parts being broken away to disclose details of internal construction, the jack being illustrated in unfolded, operative position.
Figure 2:
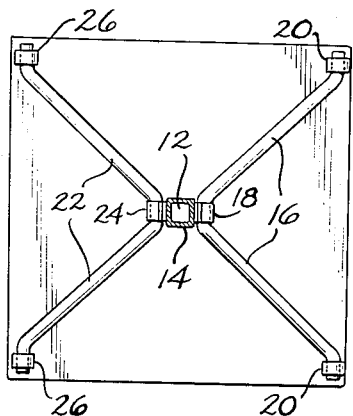
FIG. 2 is a sectional view taken along the line 2—2 in FIG. 1.

In the drawing, the jack is shown to include a base member 10 in the form of a flat structural plate. Secured to and projecting upwardly from the center of the plate is an anchor boss 12 adapted to removably seat the bottom end of the elongated post 14. In the embodiment illustrated, the post is a hollow tube and the boss is a plug dimensioned to be received freely within its open bottom end. The boss may be formed by striking central segments of the base plate upwardly to form a projection. Alternatively, the boss may be formed as an upstanding, hollow wall confining the bottom end of the post within it.

The post and base plate are interconnected pivotally by means of the fixed stabilizer rod 16 which, in the embodiment illustrated, is bent angularly intermediate its ends with the intermediate portion thereof mounted pivotally in the bearing 18 secured to the post intermediate the ends of the latter. The diverging ends of the rod are mounted pivotally in the bearings 20 secured to the base plate outwardly from the center boss.

A releasable stabilizer rod 22 of similar configuration to the fixed stabilizer rod is mounted pivotally at its intermediate portion in the bearing 24 secured to the post opposite the first named bearings 18. The diverging ends of the rod are receivable releasably in the resilient clips 26 which are secured to the base plate outwardly from the center boss and on the side of the latter opposite the bearings 20. The open sides of the clips face toward the center boss, to insure against inadvertent release of the rod under operative conditions.

In the preferred embodiment illustrated, means is provided for extending the length of the post 14. To this end an elongated hollow extension post 28 is provided with a bottom end portion having an interior dimensin substantially the same as the exterior dimension of the projecting upper end of the main post 14, whereby to be freely receivable thereover. The bottom end of the extension post rests upon the fixed bearings, as illustrated. The upper end portion of the extension post is provided with an interior dimension substantially the same as the interior dimension of the projecting upper end of the main post. Thus, either of these hollow upper ends is capable of receiving freely therein the elongated adjusting screw 30. This screw mounts an operating nut 32 which is capable of traversing the length of the screw as it is rotated. In the embodiment illustrated, such rotation of the nut is facilitated by means of the elongated handles 34 which are secured to the nut and project outwardly therefrom in opposite directions. A bearing washer 36 preferably is mounted freely on the screw, interposed between the operating nut and the upper end of the post 14, or extension post 28 if used, to facilitate turning of the nut.

The upper end of the adjusting screw is provided with an enlarged head 38 for abutment against the under side of a house trailer or other object to be supported.

With the jack arranged in the operative position illustrated in FIG. 1, with the base plate 10 resting upon the ground and the screw head 38 abutting the under side of a house trailer or the like, the operative length of the jack may be adjusted by rotating the operating nut 32 in the appropriate direction. Since the screw head bears with substantial frictional contact against the house trailer or the like, the adjusting screw 30 is held against rotation. Accordingly, rotation of the operating nut relative thereto effects appropriate lengthening or shortening of the portion of the screw between the adjusting nut and head.

As explained hereinbefore, the extension post 28 may be omitted, in which case the adjusting screw 30 is inserted freely through the open top end of the hollow main post 14.

Figure 3:
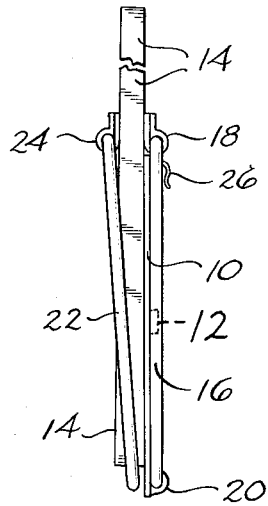
FIGS. 3 and 4 are foreshortened side elevations showing alternative arangements for folding the jack of FIG. 1.
Figure 4:
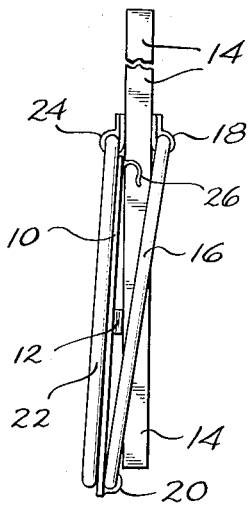

When it is desired to fold the jack for storage, either of the alternative procedures illustrated in FIGS. 3 and 4 may be employed. In FIG. 3, the lower diverging ends of the releasable stabilizer rod 22 are released from their pivot clips 26. This is achieved by rotating the releasable stabilizer rod counterclockwise about the fixed top bearings 24. The base plate 10 then is pivoted counterclockwise about the common axis of the lower fixed bearings 20 of the fixed stabilizer rod, whereupon the bottom end of the main post 14 is separated from its anchor boss 12. The main post then is rotated clockwise about the fixed top bearing 18 of the fixed stabilizer rod, sufficiently to permit the side of the base plate carrying the pivot slips 26 to rotate upward, clockwise about the lower bearings 20 of the fixed stabilizer rod, into the space between the post 14 and fixed stabilizer rod 16. The post then is rotated counterclockwise to bring it into abutment with the underside of the base plate 10, and the releasable stabilizer rod 22 also is folded toward the under side of the base plate. The main components of the jack thus are folded to a flat, compact package, as illustrated. The extension post 28, if used, and the adjusting screw 30, may be removed from the main post 14, or retained thereon, as desired.

Alternatively, referring to FIG. 4, the jack may be folded by releasing the diverging lower ends of the releasable stabilizer rod 22 from the pivot clips 36, and the bottom end of the post 14 released from its anchor boss 12, as explained hereinbefore. The post 14 then is pivoted counterclockwise about the bearing 18 for the upper end of the fixed stabilizer rod, until the lower end of the post is positioned outwardly from the axis of the bottom bearings 20 of the fixed stabilizer rod. The base plate 10 then may be pivoted clockwise into the space between the post 14 and releasable stabilizer rod 22, with the anchor boss 12 positioned in abutment with the side of the post supporting the top bearing 24 for the releasable stabilizer rod.

It is to be noted in FIGS. 3 and 4 that the axes of the bearings 18 and 24 for the top ends of the fixed and releasable stabilizer rods are displaced outwardly from the post sufficiently to accommodate the base plate 14 against the corresponding side of the post, to permit the stabilizer rods to be folded against the upper or lower side of the base plate.

It will be apparent to those skilled in the art that various changes may be made in the structural details described hereinbefore without departing from the spirit of this invention and the scope of the appended claims.

Having now described by invention and the manner in which it may be used, what I claim as new and desire to secure by Letters Patent is:

1. A folding jack, comprising
   (a) a base member,
   (b) an elongated post member,
   (c) anchor means on the base member centrally thereof releasably engaging the bottom end of the post member,
   (d) fixed stabilizer means connected pivotally at its lower end to the base member outwardly of the anchor means and connected pivotally at its upper end to the post member intermediate the ends of the latter,
   (e) releasable stabilizer means connected pivotally at one end to the post member intermediate the ends of the latter, and
   (f) releasable pivot means on the base member outwardly of the anchor means on the side of the latter opposite the pivot connection of the lower end of the fixed stabilizer means,
   (g) the releasable pivot means securing the releasable stabilizer means releasably to the base member.

2. The folding jack of claim 1 wherein the dimension of the base member between the lower pivot connection of the fixed stabilizer means and the opposite side of the base member is less than the distance between the lower and upper pivot connections of the fixed stabilizer means to the base member and post member.

3. The folding jack of claim 1 including an elongated extension post member having a hollow bottom end portion receivable freely over the top end portion of the first named post member.

4. The folding jack of claim 1 wherein the post member is hollow and the jack includes an elongated adjusting screw receivable freely through the open top end of the post member, and an operating nut threaded on the screw and abutting the top end of the post member.

5. The folding jack of claim 4 including an elongated extension post member having a hollow bottom end portion receivable freely over the top end portion of the first named post member, and a hollow top end portion adapted to receive the adjusting screw freely therein.

References Cited by the Examiner
UNITED STATES PATENTS 2,140,617  12/1938  Castady _____ 254—98 X
2,485,081  10/1949  Ahrens _____ 248—46

WILLIAM FELDMAN, *Primary Examiner.*

O. M. SIMPSON, *Examiner.*